United States Patent [19]

Palma

[11] 4,101,038
[45] Jul. 18, 1978

[54] SERVICE RACK FOR LIFT TRUCKS
[75] Inventor: Milton J. Palma, Pekin, Ill.
[73] Assignee: Caterpillar Tractor Co., Peoria, Ill.
[21] Appl. No.: 802,613
[22] Filed: Jun. 2, 1977
[51] Int. Cl.² ............................................... B65G 67/24
[52] U.S. Cl. .................................... 214/44 R; 104/34; 211/187
[58] Field of Search ................. 214/41, 85.5, 84, 44 R; 104/34; 248/236, 237, 238; 108/152; 5/81, 332; 211/187, 190, 193; 193/35 R

[56] References Cited
U.S. PATENT DOCUMENTS

| | | | |
|---|---|---|---|
| 1,479,612 | 1/1924 | Joyner | 104/34 X |
| 1,584,139 | 5/1926 | Porter | 5/332 |
| 1,931,484 | 10/1933 | Bosserdet et al. | 214/84 X |
| 3,122,244 | 2/1964 | Corso | 104/34 X |
| 3,259,365 | 7/1966 | Gibson | 104/34 X |
| 3,327,875 | 6/1967 | Goodacre | 214/84 X |

Primary Examiner—Albert J. Makay
Attorney, Agent, or Firm—Wegner, Stellman, McCord, Wiles & Wood

[57] ABSTRACT

A service rack for removing and thereafter supporting batteries from an electrically operated lift truck to permit access to vehicle components underlying the batteries and including a support bed having opposed ends and including a pair of spaced apart side rails, a plurality of rollers journalled between the rails along the length thereof and having peripheries extending above the upper edges of each of the rails with the axes of rotation of the rollers being generally transverse to the rails, an elongated leg structure, a connection for selectively securing an end of the support bed to the leg structure at any desired position thereon with the leg structure generally transverse to the support bed, a gripper at the other end of the support bed for securing the other end in elevated relation to the side of a lift truck, and a winch mounted on the leg structure for pulling a battery pack off of a lift truck to which the rack may be secured.

8 Claims, 3 Drawing Figures

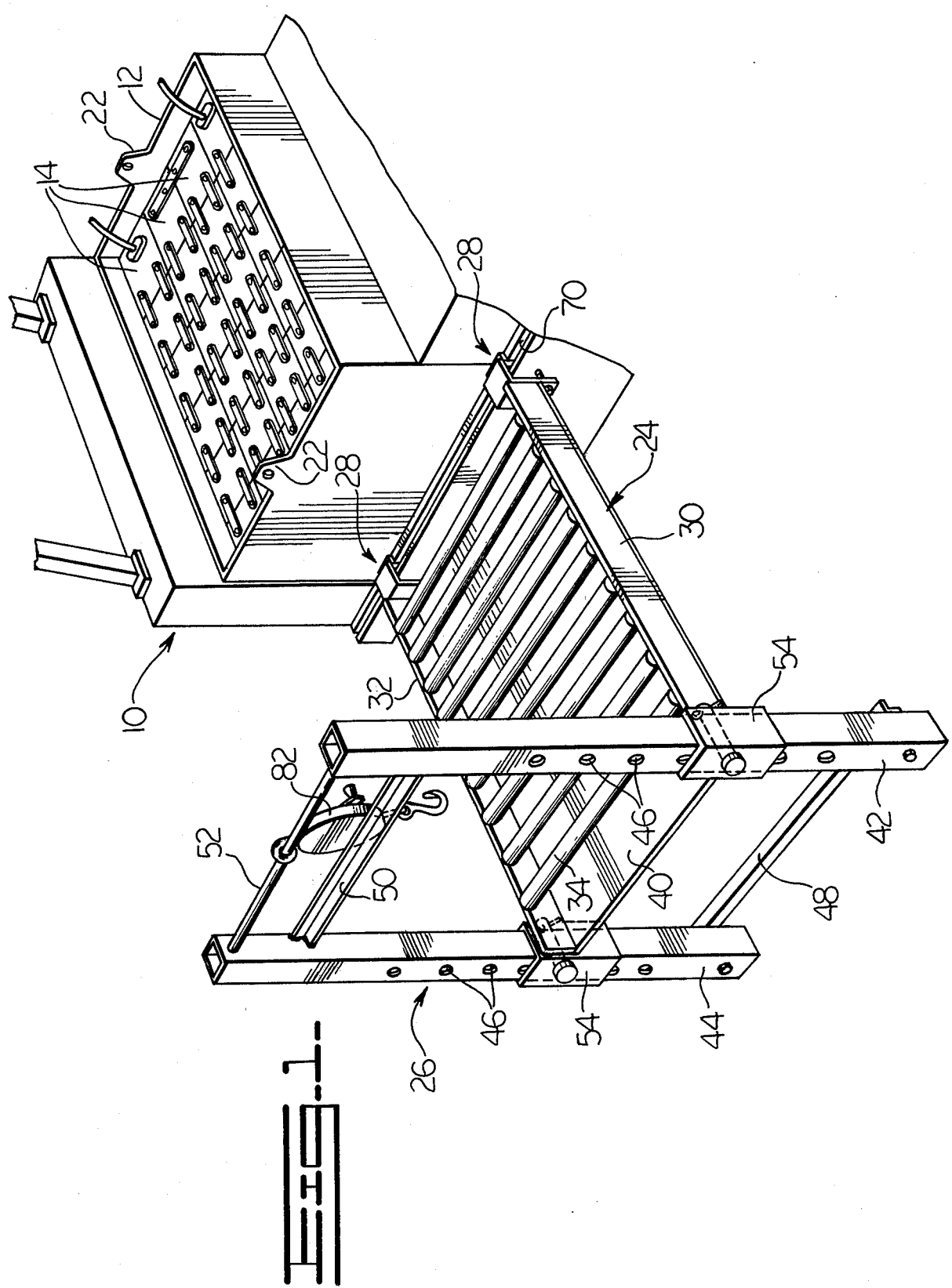

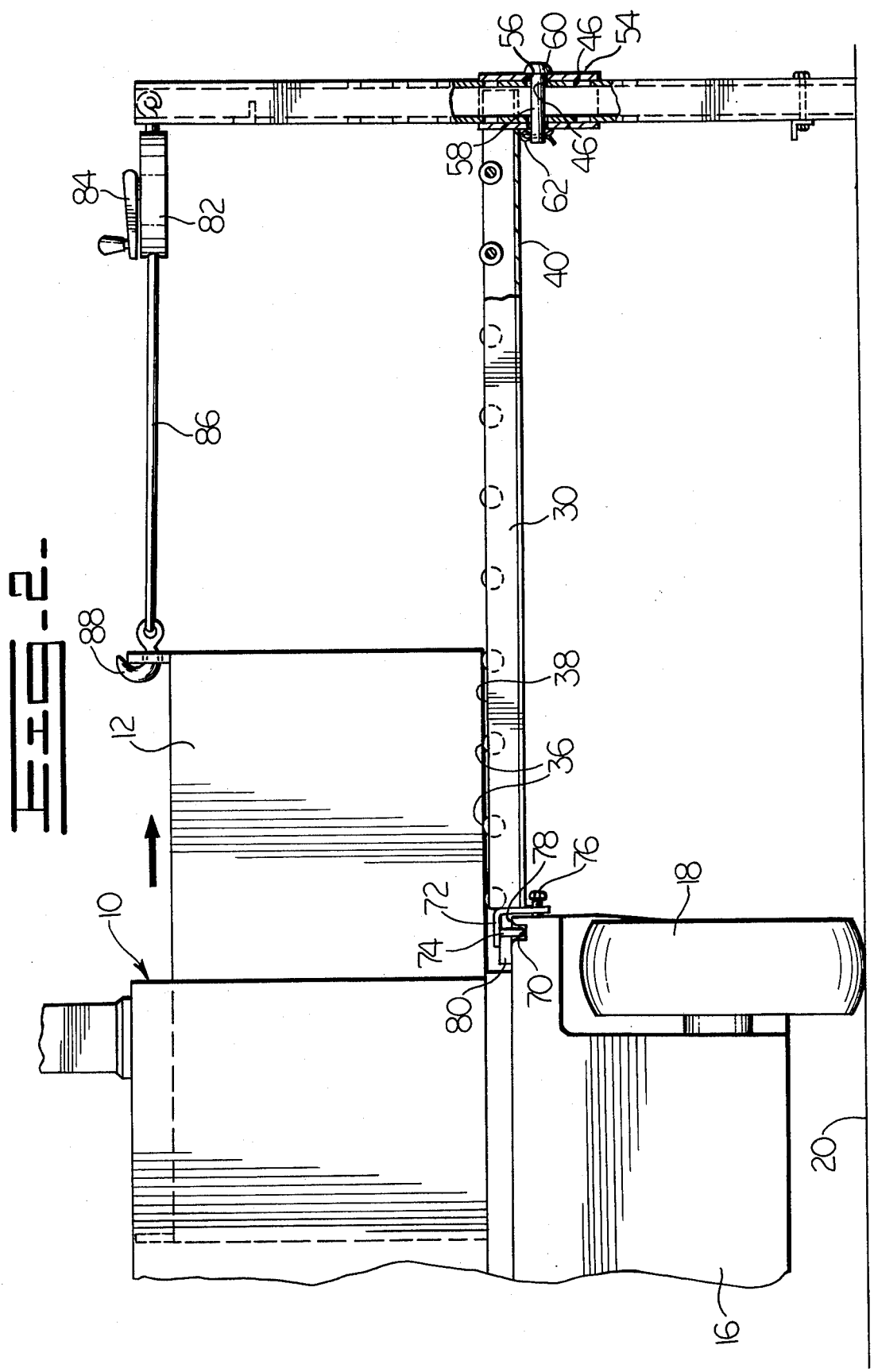

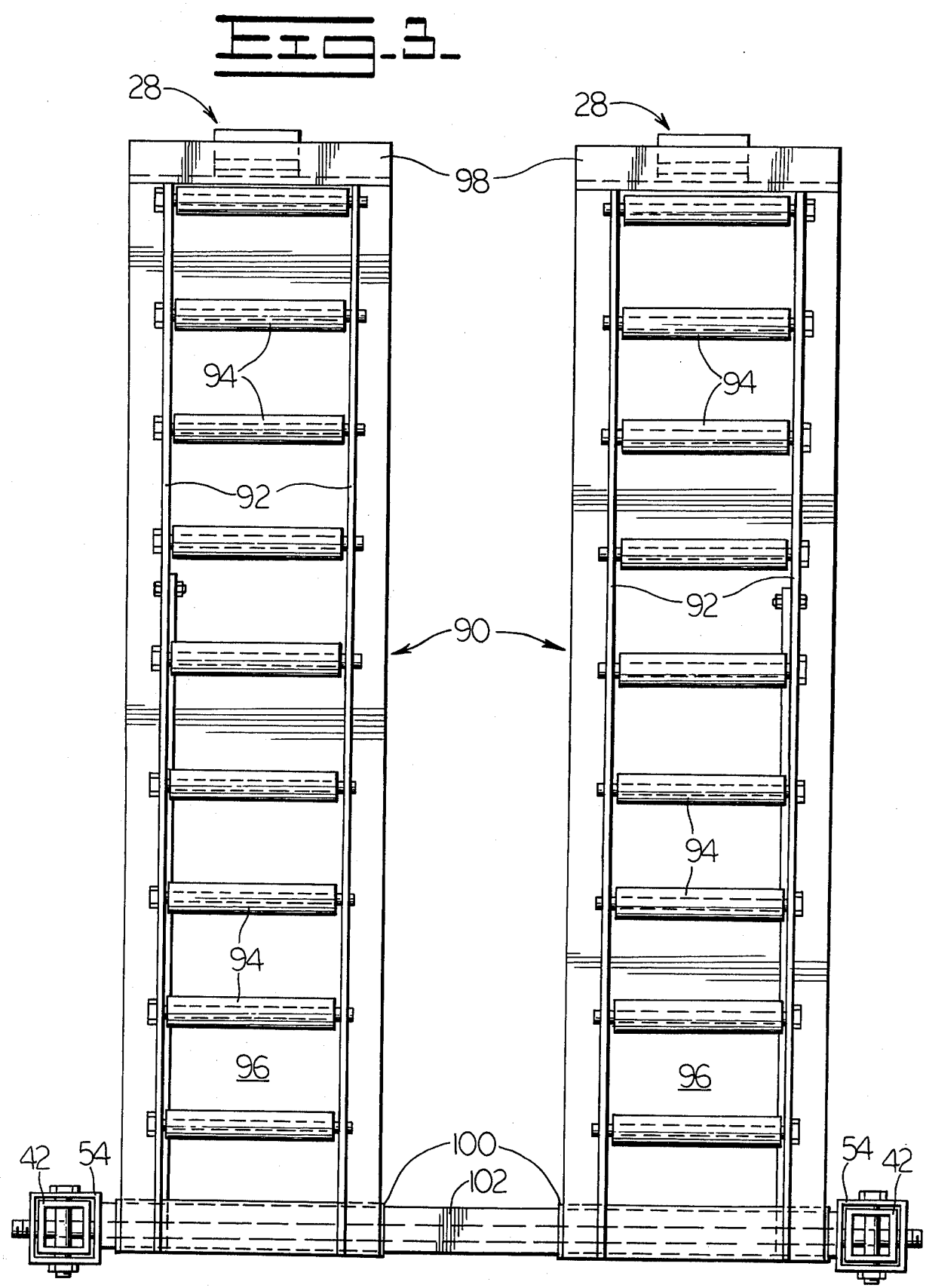

SERVICE RACK FOR LIFT TRUCKS

BACKGROUND OF THE INVENTION

This invention relates to apparatus for servicing lift trucks and, more specifically, to a service rack for use in removing and thereafter supporting the batteries employed in electrical lift trucks.

The use of lift trucks has increased greatly due to their maneuverability and load carrying capacity. Most lift trucks in use today either utilize electrical motors driven by batteries or internal combustion engines fueled by either gasoline or liquefied, bottled gas. In many instances, particularly where the lift truck is utilized in an enclosed area, electrically driven lift trucks are preferred for the reason that they emit no gases of combustion. In the usual electrically driven lift truck, there is typically provided a large pack of storage batteries having considerable weight. Oftentimes, when maintenance is required, it is necessary to remove the battery pack, particularly when the components requiring servicing or maintenance are disposed below the battery pack.

In those cases where the lift truck is utilized in close proximity to a crane or hoist having the capacity to lift the battery pack, little or no difficulty is encountered in removing the battery pack for servicing of underlying components. However, where cranes or hoists are not readily available, the removal of the battery pack has posed considerable difficulty.

SUMMARY OF THE INVENTION

The present invention is directed to overcoming one or more of the above problems.

According to the present invention, there is provided a service rack for use in removing, and thereafter supporting, heavy objects from a place of installation to permit access to other, underlying objects at the place of installation. The rack includes a support bed having opposed ends and a pair of spaced apart side rails. A plurality of rollers are journalled between the rails along the length thereof and have peripheries extending past one edge of each of the rails on at least one side of the bed. The axes of rotation of the rollers are generally transverse to the side rails. The rack also includes an elongated leg structure and means are provided for selectively securing an end of the support bed to the leg structure at a desired one of a plurality of positions along the length of the leg structure such that the leg structure will be generally transverse to the support bed. Gripper means are provided at the other end of the support bed for securing the other end of the support bed, in elevated relation, to structure at the place of installation so that the heavy objects may be moved therefrom with a minimum friction on the rollers to be supported by the support bed.

Other objects and advantages will become apparent from the following specification taken in connection with the accompanying drawings.

DESCRIPTION OF THE DRAWINGS

FIG. 1 is a perspective view of a service rack made according to the invention mounted on one side of an electrically operated lift truck;

FIG. 2 is a side elevation of the service rack with parts shown in section for clarity; and FIG. 3 is a plan of part of a modified embodiment of the invention.

DESCRIPTION OF THE PREFERRED EMBODIMENTS

An exemplary embodiment of a service mark made according to the invention is illustrated in FIGS. 1 and 2 in connection with a lift truck, generally designated 10, only part of which is shown, and the removal of a battery pack 12 therefrom. The battery pack 12 may comprise a box-like structure containing a plurality of lead storage batteries 14 (FIG. 1) which, through suitable controls, provide electrical energy for driving a drive motor (not shown) contained in a housing 16 (FIG. 2) on the lower side of the lift truck 10. The electrical motor will typically provide the drive power for wheels 18 which engage the underlying terrain 20. One or more additional electrical motors may be utilized for driving a hydraulic pump to provide hydraulic fluid under pressure for hydraulic systems or the like.

When the drive motor or drive components interconnecting the same to the wheels 18 require servicing, because of the fact they underlie the battery pack 12, it is necessary that the same be removed from the vehicle to achieve access to the components. In many cases, the removal of the battery pack 12 may be effected by connection of a hoist or crane, neither one of which is shown, to oppositely disposed, apertured ears 22 on the battery pack 12. However, when such a crane or hoist is unavailable, a service rack made according to the invention may be employed in lieu thereof.

The service rack includes a support bed, generally designated 24, an upright leg structure, generally designated 26 located at one end of the support bed 24 and extending generally transverse thereto, and gripper means, generally designated 28, whereby the end of the bed 24 opposite from the leg structure 26 may be secured, in elevated relation, to the lift truck 10.

The support bed 24 is formed of spaced apart rails 30 and 32 which are generally parallel and, when disposed in a position of use, horizontally oriented. A plurality of rollers 34 extend between the rails 30 and 32 and are journalled between the same on axles, not shown, which extend generally transverse to the rails 30 and 32 so that the axis of rotation of the rollers 34 is also transverse to the rails 30 and 32.

As perhaps best seen in FIG. 2, the peripheries 36 of the rollers extend above the upper edge 38 of each of the rails so that as the battery pack 12 is eased off the lift truck 10, it will be supported by the rollers 34 which are then free to rotate and allow relatively frictionless removal of the heavy battery pack 12 from the lift truck 10.

A bottom plate 40 extends between the rails 30 and 32 and interconnects the same to provide a measure of structural rigidity. In addition, the plate 40 may also serve to catch any electrolyte leaking from the battery pack 22 when it is diposed on the support rack 24.

The leg structure 26 is defined by two, generally parallel, spaced apart legs 42 and 44 which, in the embodiment illustrated, are formed of tubing having a square cross section. A series of apertures 46 extend through each of the legs 42 and 44 and the legs 42 and 44 are interconnected at their bottom by a cross member 48. A similar cross member 50 extends between the legs 42 and 44 adjacent the upper end thereof and finally, a mounting bar 52, also a cross member, extends between the legs 42 and 44 immediately adjacent their upper ends.

Each of the rails 30 ad 32 mounts an associated guide tube 54 which is vertically oriented, as best seen in FIG. 1. The guide tubes 54 each have a square internal cross section just slightly larger than the exterior cross section of the associated legs 42 and 44 and slidably receive the latter. In addition, and as best seen in FIG. 2, each guide tube 54 includes an aperture 56 extending therethrough which is alignable with any one of the apertures 46 in the associated legs 42 and 44. Pins 58 are provided for each of the guide tubes 54 for disposition through the apertures 56 therein and an aligned one of the apertures 46 in the associated legs 42 and 44. For retention purposes, one end of each pin 58 is provided with a head 60 while the other is provided with a through bore for receipt of a cotter key 62.

As a consequence of the foregoing construction, that end of the support bed 24 attached to the leg structure 26 can be positioned at any desired location along the length of the leg structure 26 with the leg structure 26 being maintained generally transverse to the support bed 24.

The gripper means 28 employed herein are particularly suited for attaching the rack to a lift truck having an upwardly opening groove 70 extending a substantial length along the side of the lift truck. As perhaps best seen in FIG. 2, each gripper means 28 comprises an inverted, short section of angle iron 72 welded to the end of the associated rail 30 or 32. A short section of bar stock 74 is secured, as by welding, to the underside of the horizontal portion of the angle iron 72 so that a hook formation is defined, which hook formation opens downwardly allowing disposition of the bar stock 74 in the upwardly opening groove 70. To prevent displacement of the gripper means 28 from the groove 70, each of the vertically extending portions of the angle iron 72 is provided with a tapped bore, not numbered, for receipt of a bolt 76. Once the bar stock part 74 of each hook formation is disposed in the groove 70, the corresponding bolt 76 may be threaded inwardly so as to grasp and clamp against the upwardly extending lip 78 between the side of the lift truck 10 and the groove 70.

If desired, a spacing shim 80 may be secured to each bar stock part 70 to extend generally horizontally therefrom to prevent the bar stock piece 74 from bottoming out in the groove 70.

To assist in removal of the battery pack 12 once the rack is in place, the cross member 52 mounts a hand operated winch 82 having a crank 84. A cable 86 may be drawn into or paid out from the winch 82 and includes a hook 88 on its free end which may be engaged in the apertured tabs 22. Retrieval of the cable 86 through use of the winch 82 will then cause the battery pack 12 to be pulled off of the vehicle and onto the rollers 34, as illustrated in FIG. 2. Once the battery pack 12 has been removed, free access to underlying components for servicing or replacement is allowed. In the meantime, the battery pack will be supported by the support bed 24 in a position aligned with its location on the lift truck 10.

To effect return of the battery pack 12 to the vehicle, any of a variety of measures may be employed. For one, the winch 82 may be removed from the cross member 52 and secured to any stationary structure on the opposite side of the lift truck from the rack and secured to the opposite tab 22. Retrieval of the cable 86 will result in return of the battery pack 12 to the behicle. Alternately, a pulley may be disposed on the stationary structure on the side of the vehicle opposite the rack and the cable 86 reeves thereabout and secured to the opposite tab 22. Again, retrieval of the cable 86 will result in the returning of the battery pack 22 to its place on the vehicle.

A highly preferred embodiment is illustrated in FIG. 3 wherein the support frame 24 is defined by two independent frames 90, each identical to the other. Each frame 90 is defined by parallel spaced rails 92 journalling rollers 94 therebetween. The rails 92 may be defined by the two legs of an upwardly open channel having a base 96. Cross members 98 at one end of each frame 90 mount gripper means 28 which may be identical to those previously described.

At the end of the frames 90 remote from the gripper means 28, each frame 90 mounts a tube 100 having a square cross section and extending transverse to the rails 92. A tubular cross member 102, also of square cross section, is disposed between and secured to the guide tubes 54 and further extends through the tubes 100. Consequently, the frames 90 are slidably mounted for movement towards or away from each other enabling selective variation in the width of the bed 24 as required for varying sizes of battery packs. Moreover, because the construction shown in FIG. 3 utilizes a total of four rails 92 (as opposed to two rails 30, 32), its load carrying capacity is commensurately increased.

From the foregoing, it will be appreciated that a service rack made according to the invention is ideally suited for the removal of heavy objects from a place of installation to allow access to underlying objects; and is particularly well suited for use in removing the battery pack of a lift truck from the vehicle to allow servicing of underlying components where cranes or hoists are unavailable.

The embodiments of the invention in which an exclusive property or privilege is claimed are defined as follows:

1. A service rack for use in removing and thereafter supporting heavy objects from a place of installation to permit access to other, underlying objects at the place of installation, said rack comprising:
    a support bed having opposed ends and including a pair of spaced apart side rails;
    a plurality of rollers journalled between said rails along the length thereof and having peripheries extending past one edge of each of the rails on at least one side of said bed, the axes of rotation of said rollers being generally transverse to said side rails;
    an elongated leg structure;
    means for selectively securing an end of said support bed to said leg structure at a desired one of a plurality of positions along the length of said leg structure such that said leg structure will be generally transverse to said support bed;
    gripper means at the other end of said support bed for securing said other end, in elevated relation, to structure at a place of installation; and
    winch means mounted on said leg structure.

2. The service rack of claim 1 wherein said leg structure is defined by two generally parallel, elongated legs having a series of apertures extending therethrough, and said selective securing means comprise a pair of guide tubes, one secured to said one end of each rail, and slidably receiving an associated one of said legs, an aperture in each guide tube alignable with any one of the apertures in the associated leg, and a pair of pins, one for each guide tube for disposition in the aperture of the associated guide tube and an aligned one of the apertures in the associated leg.

3. The service rack of claim 1 wherein said gripper means comprise a hook formation on said support bed other end and opening to the edge of said rails opposite side one edge, and a clamping device in said hook formation for clamping and holding an object received in said hook formation.

4. The service rack of claim 3 wherein a hook formation and associated clamping device are secured to the ends of said rails at said bed other end.

5. The service rack of claim 1 wherein said leg structure comprises two elongated spaced legs and at least one interconnecting cross member, and said winch means is mounted on said cross member between said legs.

6. A service rack comprising:
- a support bed having opposed ends and including a pair of spaced apart side rails, and a plate interconnecting the side rails at their lower edges;
- a plurality of rollers journalled between said rails along the length thereof and having peripheries extending above the upper edges of each of the rails, the axes of rotation of said rollers being generally transverse to said side rails;
- an elongated leg structure comprised of two generally parallel, elongated legs having a series of apertures extending therethrough;
- means for selectively securing an end of said support bed to said leg structure at a desired one of a plurality of positions along the length of said leg structure such that the leg structure will be generally transverse to the support bed and including a pair of guide tubes, one secured to the end of each rail adjacent said bed one end and slidably receiving an associated one of said legs, an aperture in each guide tube alignable with any one of the apertures in the associated leg, and a pair of pins, one for each guide tube, for disposition in the aperture of the associated guide tube and an aligned one of the apertures in the associated leg; and
- gripper means at the other end of said support bed for securing said other end, in elevated relation, to structure at a place of installation and comprising a hook formation on said support bed other end and opening downwardly therefrom, and a clamping device in said hook formation for clamping and holding an object received in said hook formation.

7. The service rack of claim 1 wherein said support bed comprises two separate frames each journalling a plurality of said rollers.

8. The service rack of claim 7 wherein said selective securing means includes means slidably mounting the associated ends of said frames for movement towards and away from each other.

* * * * *